United States Patent
Lee et al.

(10) Patent No.: US 8,715,845 B2
(45) Date of Patent: May 6, 2014

(54) BATTERY COVER DEVICE FOR PORTABLE TERMINAL

(75) Inventors: Sung-Ho Lee, Gumi-si (KR); Dong-Yup Lee, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 979 days.

(21) Appl. No.: 11/798,565

(22) Filed: May 15, 2007

(65) Prior Publication Data

US 2008/0081246 A1  Apr. 3, 2008

(30) Foreign Application Priority Data

Oct. 2, 2006 (KR) .................. 10-2006-0097087

(51) Int. Cl.
*H01M 2/10*  (2006.01)
(52) U.S. Cl.
USPC ........................................... 429/100
(58) Field of Classification Search
USPC .......... 429/175, 176, 96–98, 100; 292/80, 81, 292/87, 89, 96, 101–103, 107, 121, 122, 292/128, 163, 164, 175, 138, 145–147, 152, 292/300, 302, 303, DIG. 11, DIG. 38, 292/DIG. 37, DIG. 63
See application file for complete search history.

(56) References Cited

U.S. PATENT DOCUMENTS

| 6,159,632 | A | 12/2000 | Osawa |
| 2001/0044281 | A1 | 11/2001 | Peterzell |
| 2003/0114203 | A1 | 6/2003 | Lee |
| 2005/0070346 | A1 | 3/2005 | Pan |
| 2006/0172183 | A1 * | 8/2006 | Chen et al. ............ 429/97 |
| 2007/0031727 | A1 * | 2/2007 | Hsu ...................... 429/97 |

FOREIGN PATENT DOCUMENTS

| CN | 1310908 A | 8/2001 |
| CN | 1426212 A | 6/2003 |
| EP | 0712226 A | 5/1996 |
| KR | 1020020006159 | 1/2002 |
| KR | 1020020010027 | 2/2002 |

* cited by examiner

*Primary Examiner* — Ula C. Ruddock
*Assistant Examiner* — Thomas H. Parsons
(74) *Attorney, Agent, or Firm* — Roylance, Abrams, Berdo & Goodman, LLP (57) ABSTRACT

A battery cover device for a portable terminal is provided. The battery cover device includes a battery recess formed on a surface of the terminal, a cover plate adapted to attach to and detach from a surface of the terminal to cover the battery recess, and a push rod adapted to protract to and retract from a surface of the terminal. The push rod receives elastic force to protrude from a surface of the terminal and release the cover plate from the terminal. The battery cover device is advantageous in that the cover plate can be easily released by using the push rod or elastic piece, and a battery pack can be easily mounted on a slim terminal.

15 Claims, 7 Drawing Sheets

BATTERY COVER DEVICE FOR PORTABLE TERMINAL

CROSS-REFERENCE TO RELATED APPLICATION

This application claims the benefit under 35 U.S.C. §119 (a) to an application filed with the Korean Intellectual Property Office on Oct. 2, 2006 and assigned Ser. No. 2006-97087, the entire disclosure of which is hereby incorporated by reference.

BACKGROUND OF THE INVENTION

1. Field of the Invention

The present invention relates to a portable terminal. More particularly, the present invention relates to a battery cover device for a portable terminal.

2. Description of the Related Art

Portable terminals are generally used for mobile communication. However, recent portable terminals can provide conventional mobile communication and various types of services including multimedia services (for example playing music and moving picture files) and financial services such as the transfer of money and mobile banking.

Portable terminals are classified into bar-type terminals, flip-type terminals, and folder-type terminals based on their appearance. Sliding-type terminals have also recently appeared and, together with folder-type terminals, occupy a dominant position in the portable terminal market.

Bar-type terminals have an input/output device (for example keypad, transmitter), a display device, and an output device (for example receiver), all of which are positioned on a single housing. The bar-type terminals have the advantage of having simple construction. However, their compactness is adversely affected because of the fact that a distance must be secured between the transmitter and the receiver for voice communication.

Flip-type terminals have a bar-type body and a flip cover rotatably mounted on the body. Although the flip-type terminals are advantageous in that their input device (for example keypad) is covered in a standby mode to avoid erroneous operations, the fact that a distance must be secured between their transmitter and receiver for voice communication adversely affects their compactness, as in the case of the bar-type terminals.

Folder-type terminals have a pair of housings coupled to each other to fold on and unfold from each other, as well as input and output devices positioned on corresponding housings, respectively. Such construction easily secures a distance between the transmitter and receiver without degrading the compactness. Therefore, the folder-type terminals have been dominant in the portable terminal market for a long period of time.

Sliding-type terminals have a pair of housings coupled to each other so that they can slide relative to each other, as well as input and output devices positioned on corresponding housings, respectively. The input device, such as the keypad, is adapted to be exposed/covered as the housings slide relative to each other. Therefore, erroneous operations are avoided in a standby mode, and a distance is easily secured between the transmitter and receiver in a communication mode without degrading the compactness. For these reasons, the sliding-type terminals have overtaken the folder-type terminals in the market.

Portable terminals are provided with a separate battery pack as a power supply. A battery pack is mounted on a portable terminal by rotating and fastening the battery pack to the terminal while one end is supported on the terminal. The battery pack is then fixed by using a fastening protrusion which may be provided on the other end. According to another example, the battery pack slides while it is being fastened to the terminal so that the pack engages with the terminal. Then, the pack is fixed onto the terminal with a hook.

Although there have been persistent efforts to reduce the size of terminals for better portability, it has been increasingly requested to use a display device large enough to incorporate enhanced multimedia functions (for example watching broadcasts, playing moving pictures). In order to provide compact and light terminals while using a large display device for enhanced multimedia functions, it is customary to reduce the thickness of terminals for slimness.

However, conventional structures for mounting battery packs have drawbacks which result in a reduced space in which to form a protrusion, a hook, or the like, for engaging with the battery pack or fixing the battery pack after engagement once a battery mounting recess is formed on a slim terminal to fasten/release a battery pack.

Accordingly, there is a need for improved battery cover devices for portable terminals which are adapted to easily mount a battery pack on a slim terminal.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a battery cover device for a portable terminal, which is adapted to easily mount a battery pack on a slim terminal.

Another object of an exemplary embodiment of the present invention is to provide a battery cover device for a portable terminal, which is adapted to easily mount a battery pack and protect the battery pack from external impact.

Still another object of an exemplary embodiment of the present invention is to provide a battery cover device for a portable terminal, which is adapted to easily detach from the terminal.

In order to accomplish these objects, a battery cover device for a portable terminal, a cover plate and a push rod are provided. The battery cover device includes a battery recess formed on a surface of the terminal. The cover plate is adapted to attach to and detach from a surface of the terminal to cover the battery recess and the push rod is adapted to protract to and retract from a surface of the terminal. The push rod receives elastic force to protrude from a surface of the terminal and to release the cover plate from the terminal.

BRIEF DESCRIPTION OF THE DRAWINGS

The above and other exemplary objects, features, and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
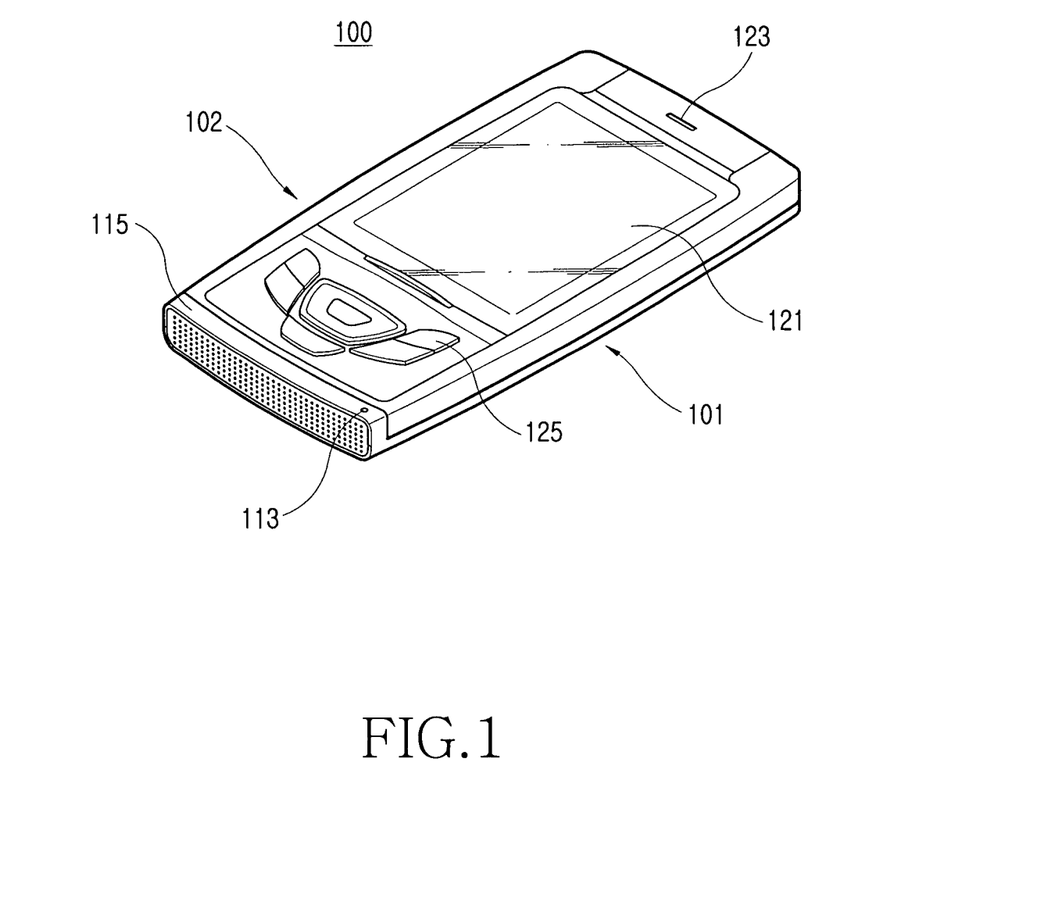
FIG. 1 is a perspective view illustrating a portable terminal provided with a battery cover device according to an exemplary embodiment of the present invention.
Figure 2:
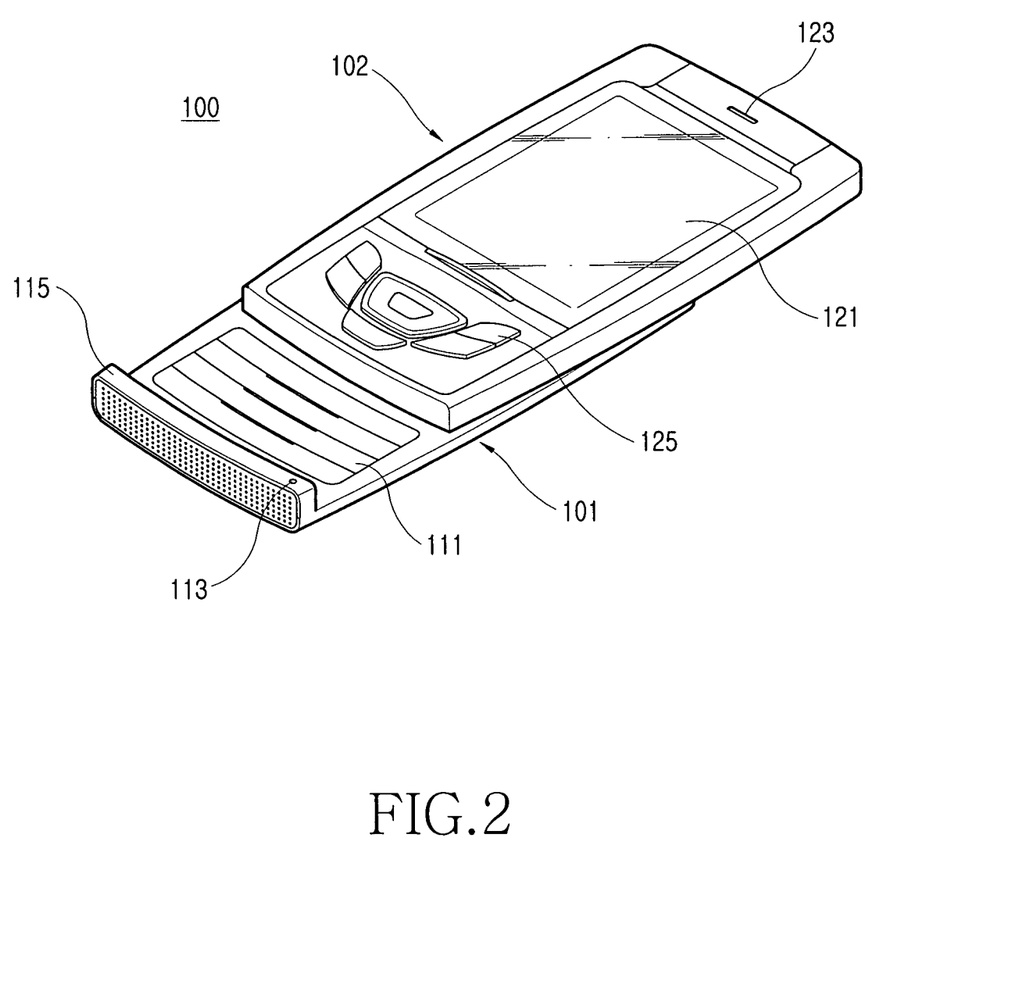
FIG. 2 is a perspective view of the portable terminal illustrated in FIG. 1 when its second housing has slid.

Referring to FIGS. 1 and 2, a portable terminal 100 provided with a battery cover device according to an exemplary embodiment of the present invention includes a first housing 101 and a second housing 102 coupled to the first housing 101 to slide thereon. The battery cover device is positioned on the rear surface of the first housing 101.

According to an exemplary embodiment of the present invention, the terminal 100 provided with the battery cover device is a sliding-type portable terminal. However, the inventive battery cover device is applicable to any type of terminal which may have a battery pack and a cover adapted to expose or cover it.

The first housing 101 has a keypad 111 and a transmitter 113, which are positioned on a surface of the portable terminal. The keypad 111 is adapted to be exposed or covered as the second housing 102 slides. The transmitter 113 is positioned on a protrusion 115, which protrudes from a surface of the first housing 101. The second housing 102 is coupled to the first housing 101 to slide while facing it and exposes or covers the keypad 111 accordingly. The second housing 102 has a display device 121, a receiver 123, and a functional keypad 125, which are positioned on a surface.

The display device 121, the receiver 123, and the functional keypad 125 are always exposed regardless of whether or not the second housing 102 slides. According to an exemplary implementation, the user can watch moving pictures or broadcasts when the first housing 101 is covered. When the keypad 111 of the first housing 101 is exposed, the user can make use of communication functions (for example calling a partner, drafting a text message or e-mail) or enjoy various games.

Figure 3:
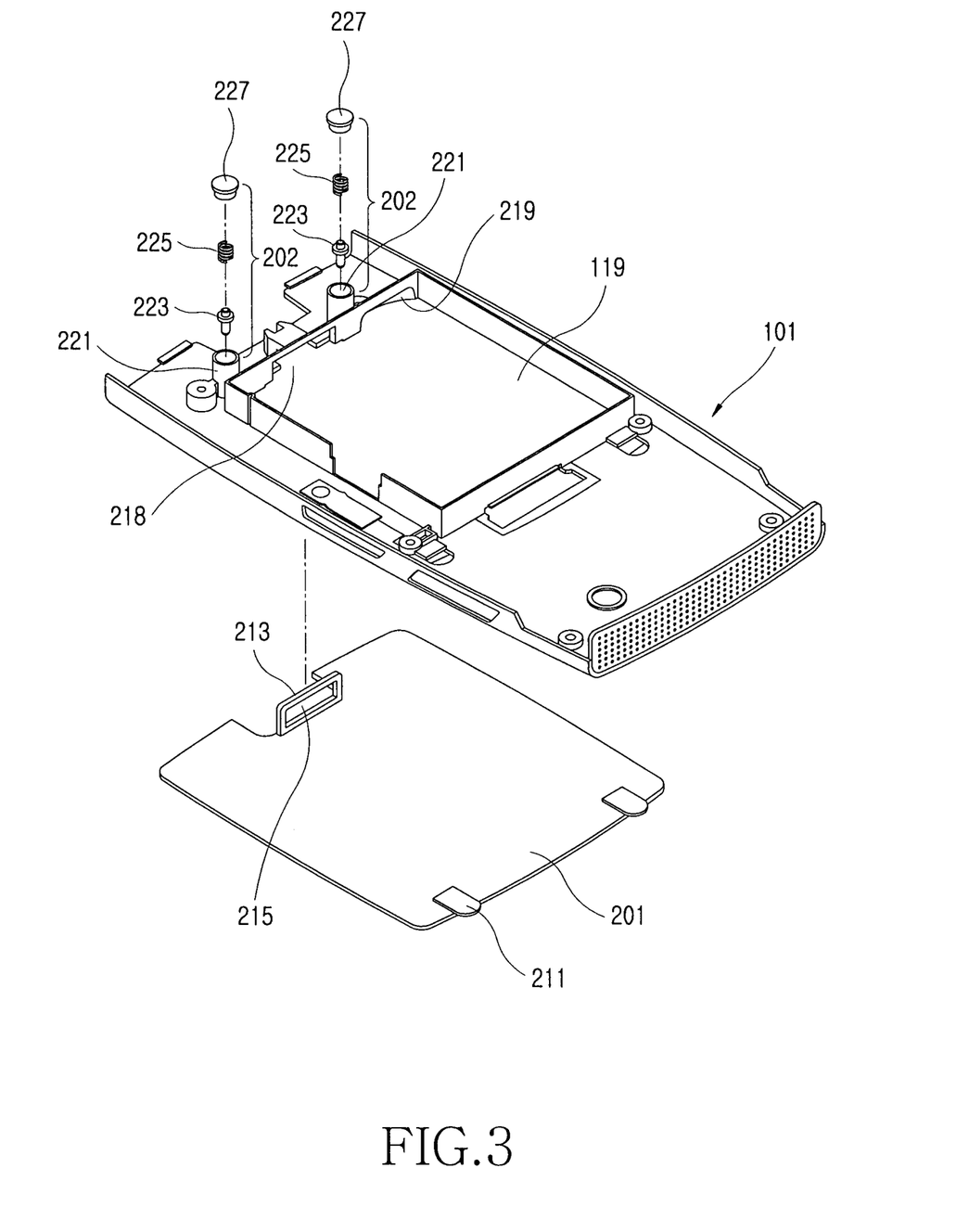
FIG. 3 is an exploded perspective view of the battery cover device of the portable terminal illustrated in FIG. 1.
Figure 4:
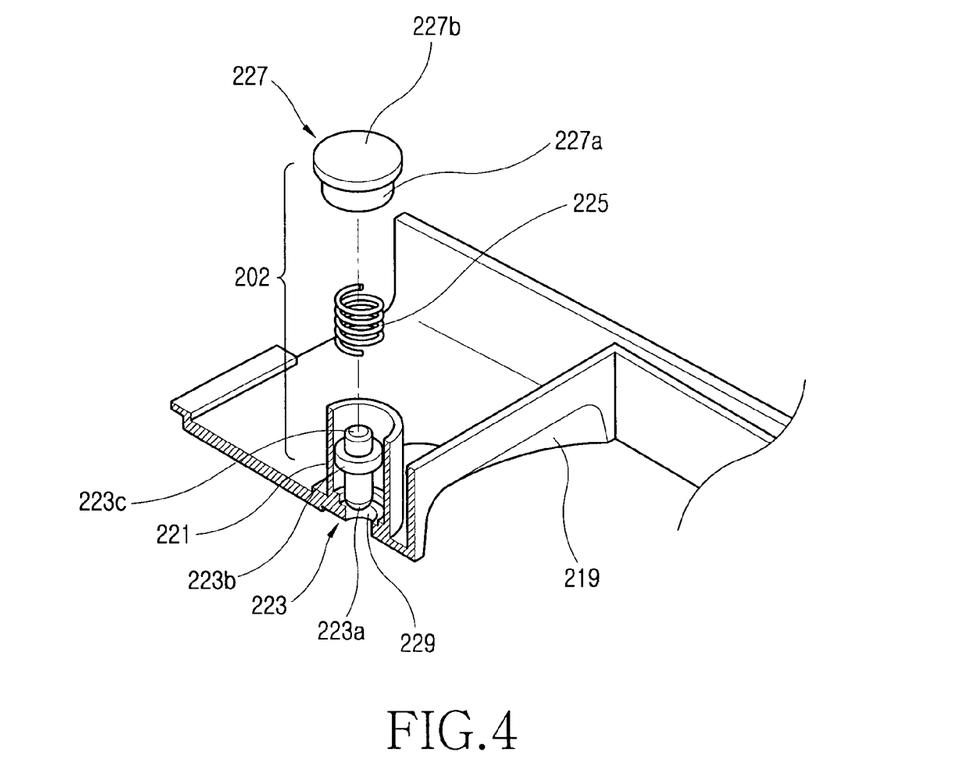
FIG. 4 is an exploded perspective view partially magnifying the battery cover device illustrated in FIG. 3.
Figure 5:
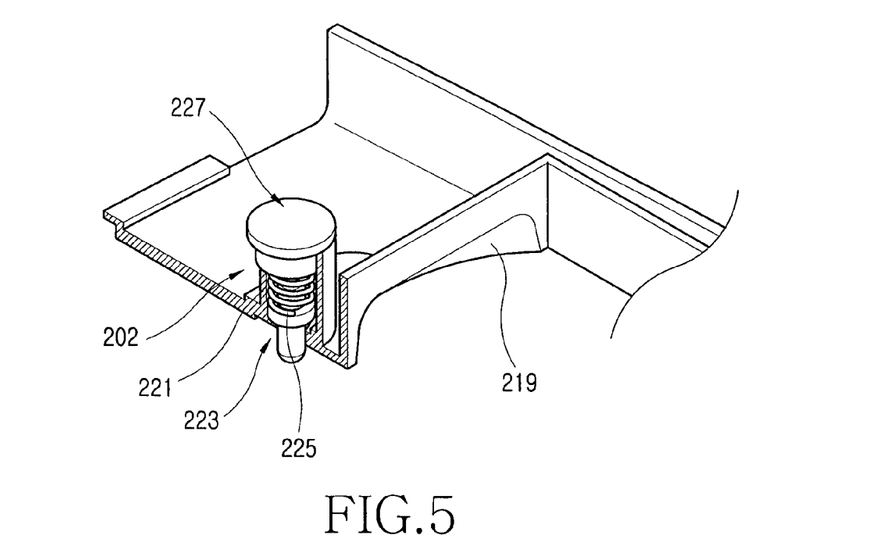
FIG. 5 is an assembled perspective view partially magnifying the battery cover device illustrated in FIG. 3.

Referring to FIGS. 3 to 5, the first housing 101 has a battery recess 119 formed on an alternate surface. The battery recess 119 is exposed or covered by a separate cover plate 201. According to an exemplary implementation, the cover plate 201 is mounted on the first housing 101 of the terminal 100, while a battery pack (not shown) is contained in the battery recess 119, to cover the battery recess 119 and to protect the battery pack contained therein.

In order to fix the cover plate 201 to the first housing 101, the cover plate 201 has a pair of first engaging ribs 211 formed on one end of the cover plate and a second engaging rib 213 formed on the other end of the cover plate. The first engaging ribs 211 extend from the inner surface of one end of the cover plate 201 in the outward direction while being parallel to each other. The second engaging rib 213 protrudes from the inner surface of the other end of the cover plate 201. A hook hole 215 extends through both surfaces of the second engaging rib 213.

Figure 6:
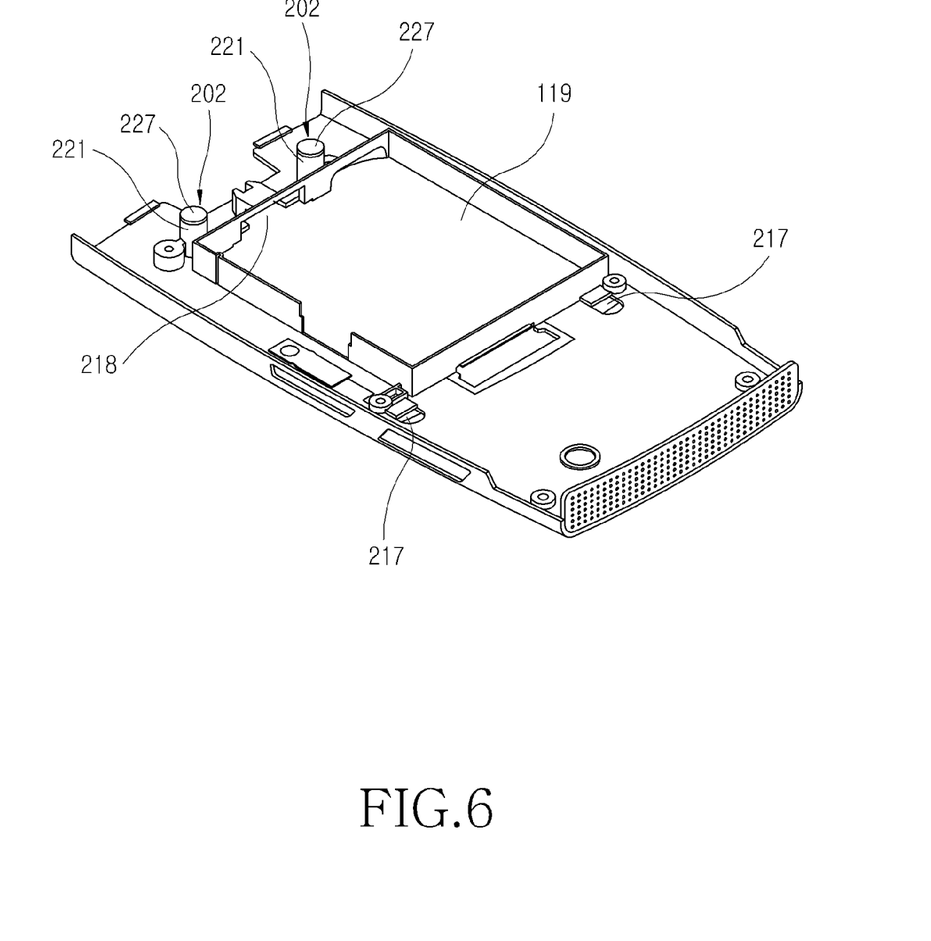
FIG. 6 is a perspective view of the interior of the portable terminal illustrated in FIG. 1.
Figure 7:
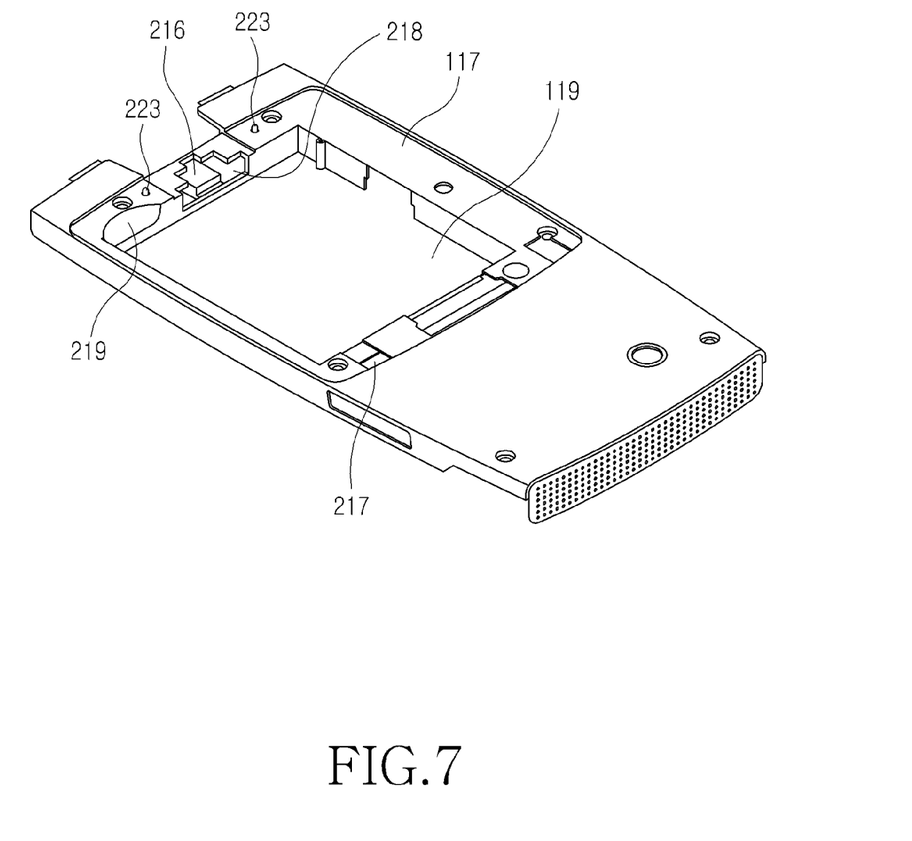
FIG. 7 is a perspective view of the exterior of the portable terminal illustrated in FIG. 1.

Referring to FIGS. 6 and 7, in order to fix the cover plate 201 to the first housing 101, the first housing 101 has engaging recesses 217 formed on one side of the battery recess 119 and a hook 216 positioned on the other side thereof and adapted to protract to and retract from the battery recess 119. The battery recess 119 has a working recess 218 formed on the other side of the first housing so that the hook 216 is accommodated therein and protracts to or retracts from the battery recess 119 along a linear path. A coil spring (not shown) is positioned in the working recess 218 and provides an elastic force in a direction to facilitate the movement of the hook 216 towards the battery recess 119. The construction of the hook 216 and the coil spring can be easily understood by those skilled in the art.

The cover plate 201 is rotated about the first engaging ribs 211 while the first engaging ribs 211 engage with the engaging recesses 217 so that the cover plate 201 is fastened to the first housing 101. Then, the second engaging rib 213 moves into the battery recess 119. The hook hole 215, which is formed on the second engaging rib 213, comes to face the hook 216, which protracts to the battery recess 119 due to the elastic force from the coil spring and engages with the second engaging rib 213, particularly the hook hole 215. As a result, the cover plate 201 is fixed to the first housing 101 while covering the battery recess 119.

A cover recess 117 is formed on the cover plate 201 to prevent the cover plate 201 from protruding from the outer peripheral surface of the first housing 101 when mounted on the first housing 101. The cover recess 117 surrounds the battery recess 119, and the depth of the cover recess 117 measured from the outer peripheral surface of the first housing 101 corresponds to the thickness of the cover plate 201. Therefore, when mounted on the first housing 101, the cover plate 201 is positioned inside the cover recess 117 with its outer peripheral surface being flush with that of the first housing 101.

In order to facilitate replacement of the battery pack contained in the battery recess 119, a release recess 219 is formed on the wall of an end of the battery recess 119. The release recess 219 exposes a portion of a lateral surface of the battery pack, when it is mounted on the battery recess 119, to the exterior so that the user can fasten his/her finger, for example, to the exposed portion and pull it for release of the battery pack.

When the user needs to release the cover plate 201 when it is covering the battery recess 119, the hook 216 must be retracted to disengage from the second engaging rib 213. However, even when the hook 216 has disengaged from the second engaging rib 213, it is not easy to directly release the cover plate 201 from the first housing 101, because the cover plate 201 is positioned in the cover recess 117 with its outer peripheral surface being flush with that of the first housing 101.

According to an exemplary implementation, the battery cover device is provided with release devices 202 for releasing the cover plate 201 from the first hosing 101.

The release devices 202 are positioned on the other side of the battery recess 119, particularly on both sides of the hook 216, respectively. Each release device 202 has a push rod 223 adapted to protract to and retract from a surface of the first housing 101. Particularly, when the hook 216 disengages from the second engaging rib 213, the push rods 223 protrude from the surface of the first housing 101 and release the cover plate 201 from the first housing 101.

Referring to FIGS. 4 and 5, the push rods 223 include a support body 223b, a driving body 223a extending from a surface of the support body 223b, and a support pin 223c extending from another surface of the support body 223b. The push rods 223 are installed on the first housing 101 so that they can move linearly, and more particularly, so that an end of their driving body 223a can protract to and retract from a surface of the first housing 101.

In order to install the push rods 223 on the first housing 101, the first housing 101 has cylindrical receiving housings 221 formed on its inner surface. The interior of the receiving housings 221 communicate with through-holes 229 formed on the first housing 101. The push rods 223 are contained in respective receiving housings 221 so that they can move linearly, and more particularly, so that their driving body 223a can protrude to and retract from a surface of the first housing 101 via the through-holes 229. When the driving bodies 223a protrude from a surface of the first housing 101, particularly the cover recess 117, they release the cover plate 201, which is in a disengaged condition.

Each receiving housing 221 has an elastic member 225 positioned therein to exert elastic force in such a direction that the driving bodies 223a of the push rods 223 protrude from a surface of the first housing 101, as well as a cap member 227 fitted onto an end of the receiving housing 221 to close it.

The cap members 227 include a fixing body 227a inserted into an end of the receiving housings 221 and fixed thereto, as well as a disk 227b for closing the end of the receiving housings 221. The fixing bodies 227a are formed on a surface of the disks 227b. As such, when the fixing bodies 227a are inserted into and fixed to an end of the receiving housings 221, the disks 227b close the receiving housings 221.

By fixing the cap members 227 to the receiving housings 221, one end of the elastic members 225 is supported on the fixing bodies 227a, and the other end thereof is supported on the support bodies 223b of the push rods 223. This provides elastic force so that the driving bodies 223a of the push rods 223 protrude from a surface of the first housing 101. A part of the elastic members 225 is wound around the outer peripheral surface of the support pins 223c and coupled thereto so that the other end of the elastic members 225 is supported on the support bodies 223b.

Referring to FIG. 7 again, when the cover plate 201 has been released from the first housing 101, an end of each push rod 223 protrudes from a surface of the first housing 101. According to an exemplary implementation, the driving bodies 223a protrude from the cover recess 117. The push rods 223 are positioned on both sides of the hook 216. Particularly, a pair of push rods 223 is positioned on the other side of the battery recess 119 while being spaced from each other.

Figure 8:
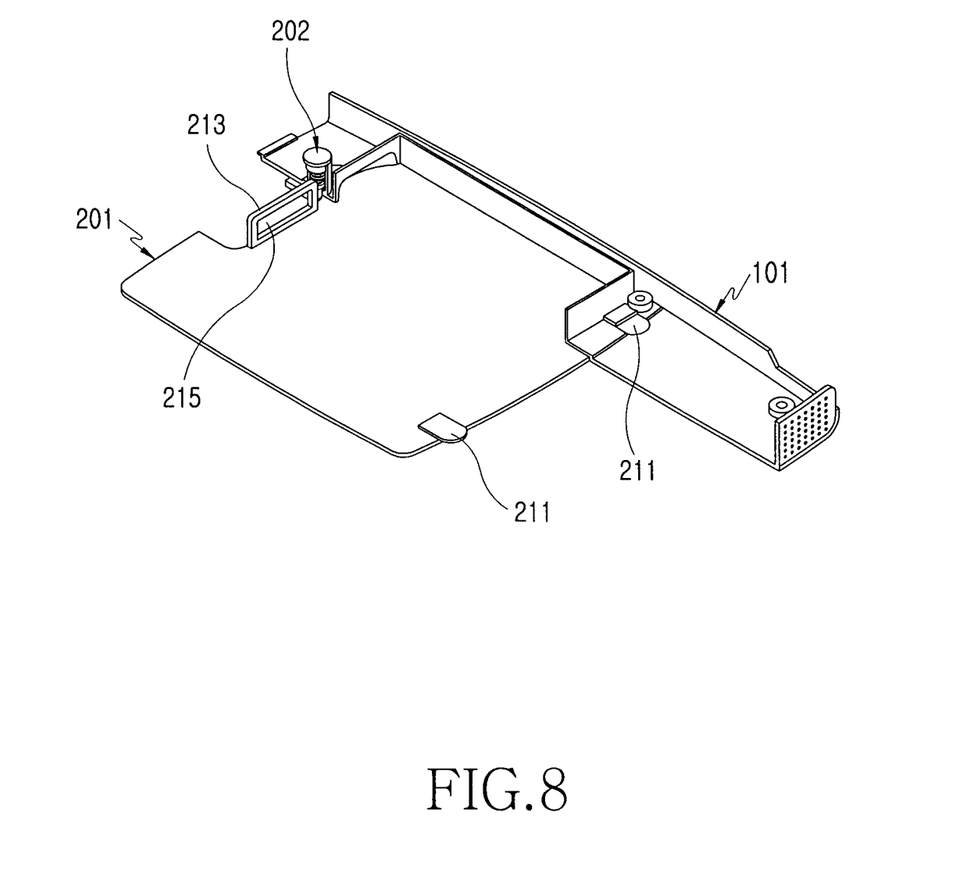
FIG. 8 is a perspective view of the portable terminal illustrated in FIG. 1 when it is equipped with a cover plate.

Referring to FIG. 8, when the cover plate 201 is mounted on the first housing 101, the first engaging ribs 211 engage with corresponding engaging recesses 217, respectively, and the hook 216 fixedly engages with the hook hole 215 of the second engaging rib 213. Then, the push rods 223 retract into the receiving housings 221 on the first housing 101.

When the user retracts the hook 216 so that it disengages from the second engaging rib 213, an end of each push rod 223 protrudes due to the elastic force from the elastic member 225 and releases the cover plate 201 from the first housing 101. As such, the cover plate 201 is easily released from the first housing 101.

The battery cover device for a portable terminal according to an exemplary embodiment of the present invention is advantageous since the cover plate can be easily released from the terminal by means of push rods or elastic pieces when the cover plate covers the battery recess for containing the battery pack. The battery pack may also be easily mounted on a slim terminal and is protected from external impact as the cover plate covers the battery recess and the battery pack.

Although it has been assumed in the above description of a battery cover device according to an exemplary embodiment of the present invention that the battery pack is contained in the first housing 101 of a sliding-type terminal 100, the battery cover device is applicable to any type of terminal (for example bar-type terminal, folder-type terminal). In addition, the shape of the battery recess for containing the battery pack may be modified if necessary as long as it can be covered by a corresponding cover plate.

Although the cylindrical receiving housing 221 includes a push rod 223, an elastic member 225, and a cap member 227 according to an exemplary embodiment of the present invention, the construction of the release device 202 may be modified as long as the cover plate 201 can be released from the first housing 101 when they have disengaged from each other. For example, an elastic piece may be placed on one side of the battery recess 119 to exert elastic force in such a direction that a portion of the elastic piece protrudes from the cover recess 117. This feature plays a role analogous to that of the release device 202 without using the above components (for example push rod 223). For example, the release device 202 may be replaced with an elastic piece, such as a leaf spring. An elastically deformable member (for example urethane, silicon) may also be attached to the cover recess 117 to easily release the cover plate 201 from the first housing 101. However, it is to be noted that, regarding the construction of the release device 202, the cover plate 201 should not receive a force so large that it is deformed or its edge protrudes from the outer peripheral surface of the terminal 100.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A battery cover device for a portable terminal, the terminal comprising a housing and a battery recess formed on the housing, the battery cover device comprising:
   a cover plate attached to the housing of the terminal to cover the battery recess, the cover plate being detachable from the terminal, the cover plate comprising a hook receiving portion and one or more engaging ribs configured to engage the housing;
   a push rod device connected to the housing, the push rod device comprising a spring, the spring is compressed and applies an elastic force on the cover plate when the cover plate is locked to the terminal; and
   a hook connected to the housing, the hook being extendable into and retractable from the hook receiving portion of the cover plate to lock and unlock the cover plate to the terminal;
   wherein the push rod device is positioned on each of two opposing sides of the hook; and
   wherein when the hook is retracted from the hook receiving portion of the cover plate, the cover plate is unlocked from the terminal and a portion of the push rod device protrudes from a surface of the housing, as the spring of the push rod device decompresses by releasing elastic force to the cover plate so that the cover plate is released from the housing of the terminal.

2. The battery cover device as claimed in claim 1, further comprising an elastic member positioned in the terminal to provide the elastic force to facilitate a push rod of the push rod device to protrude from a surface of the terminal.

3. The battery cover device as claimed in claim 1, further comprising a cylindrical receiving housing formed on an inner surface of the terminal and an elastic member contained in the receiving housing.

4. The battery cover device as claimed in claim 3, further comprising a cap member coupled to an end of the receiving housing to close the receiving housing, and the elastic member comprising a first end supported on the cap member and a second end supported on a push rod of the push rod device.

5. The battery cover device as claimed in claim 3, wherein a push rod of the push rod device is contained in the receiving housing to extend into and retract from the receiving housing, and the push rod is adapted to protrude from a surface of the terminal by means of elastic force from an elastic member.

6. The battery cover device as claimed in claim 1, further comprising:
    an engaging recess formed on a first side of the battery recess;
    wherein the hook is formed on a second side of the battery recess; and
    wherein the one or more engaging ribs comprise a first engaging rib formed on a first end of the cover plate and a second engaging rib formed on a second end of the cover plate.

7. The battery cover device as claimed in claim 6, wherein the push rod device is positioned on the second side of the battery recess and adapted to retract into the terminal when the cover plate is mounted on the terminal.

8. The battery cover device as claimed in claim 6, wherein a push rod of the push rod device is adapted to protrude from a surface of the terminal and release the cover plate from the terminal when the hook disengages from the second engaging rib.

9. The battery cover device as claimed in claim 6, wherein the second engaging rib is adapted to move into the battery recess and engage with the hook when the cover plate is mounted on the terminal.

10. The battery cover device as claimed in claim 6, wherein the hook is adapted to engage with the second engaging rib when the cover plate is fastened to the terminal while the first engaging rib engages with the engaging recess.

11. The battery cover device as claimed in claim 1, wherein a pair of push rods of the push rod device are positioned adjacent to the battery recess and spaced from each other.

12. The battery cover device as claimed in claim 1, wherein a cover recess is formed on a surface of the terminal to substantially surround the battery recess.

13. The battery cover device as claimed in claim 12, wherein a push rod of the push rod device is adapted to extend into and retract from the cover recess.

14. The battery cover device as claimed in claim 12, wherein the cover recess is depressed from an outer peripheral surface of the terminal to a depth corresponding to a thickness of the cover plate, and the cover plate is mounted on a surface of the terminal to be positioned in the cover recess.

15. The battery cover device as claimed in claim 1, wherein a release recess is formed on a wall of an end of the battery recess, and a portion of a lateral surface of a battery pack mounted on the battery recess is exposed via the release recess.

* * * * *